(12) United States Patent
Ibrahimbegovic et al.

(10) Patent No.: US 9,213,930 B2
(45) Date of Patent: *Dec. 15, 2015

(54) SECURE BARCODES

(71) Applicant: VERISIGN, INC., Reston, VA (US)

(72) Inventors: Jasenko Ibrahimbegovic, Vaud (CH);
Matthew Thomas, Atlanta, GA (US);
Vincenzo Russo, Canton of Bern (CH)

(73) Assignee: VERISIGN, INC., Reston, VA (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/919,607

(22) Filed: Jun. 17, 2013

(65) Prior Publication Data

US 2013/0320100 A1    Dec. 5, 2013

Related U.S. Application Data

(63) Continuation of application No. 13/173,606, filed on Jun. 30, 2011, now Pat. No. 8,464,960.

(51) Int. Cl.
*G06K 5/00* (2006.01)
*G06K 19/06* (2006.01)
*H04L 29/06* (2006.01)
*G06F 21/33* (2013.01)

(52) U.S. Cl.
CPC ........ *G06K 19/06037* (2013.01); *G06F 21/335* (2013.01); *G06K 5/00* (2013.01); *H04L 63/0823* (2013.01); *H04L 63/12* (2013.01); *H04L 63/145* (2013.01)

(58) Field of Classification Search
USPC .......................................... 235/494; 380/243
See application file for complete search history.

(56) References Cited

U.S. PATENT DOCUMENTS 6,674,923 B1    1/2004    Shih et al.
7,028,902 B2    4/2006    Xu et al.
(Continued)

FOREIGN PATENT DOCUMENTS

JP    2007-115226    5/2007
JP    2007-316697    12/2007
(Continued)

OTHER PUBLICATIONS

Camera Phone Based Barcode Scanning, CTIA Code Scan Action Team White Paper, Sep. 9, 2008, available at http://files.ctia.org/pdf/WhitePaper_CTIA_WIC_CodeScan_9_08.pdf.
(Continued)

*Primary Examiner* — Daniel Hess
(74) *Attorney, Agent, or Firm* — MH2 Technology Law Group, LLP (57) ABSTRACT

Methods and systems for generating and authenticating barcodes and in particular generating secure barcodes are disclosed. In one embodiment, a method, performed by a certificate authority for creating a trusted content, comprises receiving, via a receiver, a target content and verifying the target content to determine whether the target content is safe or appropriate. Further, the method comprises, based on a result of the verifying, generating and storing, in a storage medium, response data; generating, via a processor, and storing in the storage medium an identifier corresponding to the response data; generating, via the processor, resolution data, the resolution data including the identifier and an address of the certificate authority; and transmitting, via a transmitter, the resolution data as the trusted content.

25 Claims, 6 Drawing Sheets

(56) References Cited

U.S. PATENT DOCUMENTS

| | | | |
|---|---|---|---|
| 7,636,696 B1* | 12/2009 | Sigler et al. | 705/74 |
| 8,464,960 B2* | 6/2013 | Ibrahimbegovic et al. | 235/494 |
| 2001/0011276 A1 | 8/2001 | Durst, Jr. et al. | |
| 2005/0288938 A1 | 12/2005 | Date et al. | |
| 2007/0111713 A1 | 5/2007 | Silverbrook et al. | |
| 2007/0182801 A1 | 8/2007 | Shoji et al. | |
| 2008/0066163 A1 | 3/2008 | Raheman | |
| 2009/0300106 A1 | 12/2009 | Woodside et al. | |
| 2009/0307232 A1 | 12/2009 | Hall | |
| 2010/0199089 A1 | 8/2010 | Vysogorets et al. | |
| 2012/0308003 A1 | 12/2012 | Mukherjee | |

FOREIGN PATENT DOCUMENTS

| | | |
|---|---|---|
| WO | 2009/101549 | 8/2009 |
| WO | 2010/066480 | 6/2010 |

OTHER PUBLICATIONS

Jeng-Fang et al., "The Study of RSA Algorithm on QR Code Design," Thesis for Master of Science, Department of Computer Science and Engineering, Tatung University, Jun. 2008.

Seino, et al., "Development of the traceability system which secures the safety of fishery products using the QR code and a digital signature," In Proceedings of Marine Technology Society/IEEE Techno-Ocean, vol. 1, 476-481 (2004).

Young Sil Lee et al., "Online Banking Authentication System using Mobile-OTP with QR-code," Computer Sciences and Convergence Information Technology (ICCIT), 2010 5th International Conference, Nov. 30, 2010-Dec. 20, 2010, pp. 644-648.

Internet Article "Verisign adds malware scanning to SSL services" dated Jul. 19, 2010, by Elinor Mills published at Cnet News and retrieved at http://news.cnet.com/8301-27080_3-20010945-245.html.

Internet Article, "X.509" retrieved Aug. 30, 2012 from www.wikipedia.com.

Elinor Mills, "VeriSign Adds Malware Scanning to SSL Services", Jul. 19, 2010, XP002712076, http://news.cnet.com/8301-27080_3-20010945-245.html, retrieved Aug. 26, 2013, p. 1.

Jaesik Lee et al., "Secure Quick Response-Payment (QR-Pay) System Using Mobile Device", Advanced Communication Technology (ICACT), 2011 13th International Conference on IEEE, Feb. 13, 2011, pp. 1424-1427.

Peter Kieseberg et al., "QR Code Security", Advances in Mobile Computing and Multimedia, ACM, Nov. 8, 2010, pp. 430-435.

Extended European Search Report dated Sep. 11, 2013, European Application No. 12174525.1, filed Jun. 29, 2012, pp. 1-6.

* cited by examiner

SECURE BARCODES

CROSS REFERENCE TO RELATED APPLICATIONS

This application is a continuation of U.S. patent application Ser. No. 13/173,606 filed on Jun. 30, 2011, which is hereby incorporated by reference into the present disclosure.

TECHNICAL FIELD

The present disclosure relates generally to methods and systems for generating and authenticating barcodes and in particular to generating trusted barcodes.

BACKGROUND

As business, governmental, academic, and scientific operations become increasingly computer-enabled and, thus, dependent on the storage and manipulation of electronic or digital information, a greater need arises for efficient mechanisms for communicating electronic information to users.

Barcodes provide a useful and convenient way to convey electronic information through a variety of electronic devices. A barcode is generally an optical machine-readable representation of data, which, for example, shows data about the object to which it is attached. Traditionally, barcodes have represented data by varying the widths and spacings of parallel dark lines and are often referred to as linear or one-dimensional (1D) barcodes. 1D barcodes are scanned in a one-dimensional fashion by special-purpose optical scanning devices that are able to decode the information encoded in the barcodes by measuring the widths and spacings of the parallel barcode lines through reflective light feedback.

1D barcodes, however, suffer from the drawback that their one-dimensional structure allows for only a limited amount of information to be encoded in the barcode. For example, a Universal Product Code (UPC), which is a one-dimensional barcode format that enjoys widespread usage today, is capable of encoding only 12 decimal digits, including start and end patterns. Because of this limitation, the last several decades have seen significant growth in the number of standards for two-dimensional (2D) or "matrix" barcodes.

Many matrix barcodes mimic the functionality of traditional one-dimensional barcodes by providing a pattern of two-dimensionally arranged squares, rectangles, dots, hexagons, or other shapes of varying lengths and widths distributed in two dimensions. One example of a type of matrix barcode that has enjoyed popular usage is the Quick Response or "QR" code standard. Governed by several standards, various versions of QR codes are capable of storing up to 7,089 numeric code characters, 4,296 alphanumeric characters, or 2,953 bytes when encoding purely binary data.

Although by no means a new standard, QR codes have recently gained widespread use as a result of the advancement of mobile devices, such as smartphones, which are capable of reading and quickly rendering barcode data such as QR codes. One common use of QR codes has been to encode Uniform Resource Locators ("URLs"), such as website addresses. Such QR codes are often placed on billboards, mailers, or even buildings to provide consumers with a quick and easy way to visit a company's website without having to memorize, write down, or manually type a URL into a smartphone or other mobile devices. Consumers who see a QR code displayed may take a picture of the QR code using a camera embedded, for example, in the smartphone, and may utilize a smartphone application to automatically translate the QR code to a URL and launch a browser application pointed to the URL. Additional commercial uses of QR codes include encoding coupons or other purchase information into QR codes; customers may decode such QR codes into graphical or textual coupons and present those coupons at businesses to receive discounts on purchased goods or services.

One problem with barcodes, including QR codes, is their safety: that is, it may be difficult or impossible for a user to determine whether a URL encoded within a QR code points to a malicious or otherwise inappropriate website. For example, although a business could attach a QR code on a billboard to advertise its website custom address, an imposter may surreptitiously overlay a second QR code over the original QR code, such that the second QR code directs customers to the imposter's website intended to mimic the website of the business. The imposter's website may then perform malicious acts, such as, infect the user's device with malware or steal the user's password or identity information. Similarly, customers providing or decoding QR codes for the purpose of obtaining coupons or discounts could potentially print out or display forged QR codes that fraudulently entitle them to increased discounts or rewards.

Therefore, there is a need for a system to create for businesses QR codes that promote those businesses in a manner that prevents an imposter from abusing the QR code. Alternatively, there is a need for a method to enable the user to verify or at least assure that a URL encoded in a QR code is secure and thus can be trusted.

SUMMARY

The disclosure is directed to methods and systems for introducing trust into bar codes, such as QR codes, by providing a mechanism for a trusted third-party, such as a Certificate Authority (CA), to verify their content.

In implementations, a non-transitory computer readable storage medium comprising instruction that cause one or more processors to perform a method is disclosed. The method can include receiving target content data; verifying the target content data; generating an identifier corresponding to the target content data that has been verified; generating resolution data comprising an n-dimensional barcode that includes identifier information corresponding to the identifier and address information corresponding to an internet protocol (IP) address of a trusted third party; and providing the resolution data to a user.

In implementations, the method can include receiving request data that includes the identifier, extracting the identifier from the request data, identifying response data based on the identifier, and providing the response data.

In implementations, the verifying the target content data can further include determining whether the target content data is safe; if the target content data is determined to be safe, providing the target content data with response data; and if the target content data is determined to be unsafe, providing a warning message with response data, wherein the warning message provides an indication that the target content data is unsafe.

In implementations, the verifying the target content data can further include analyzing the target content data; determining if the target content data is related to at least one of malware or inappropriate content; upon determining that the target content data is related to at least one of the malware or the inappropriate content, providing a warning message with response data, wherein the warning message provides an indication that the target content data is related to at least one of the malware or the inappropriate content.

In implementations, the target content data can include at least one of a target internet address, a promotion, an image, or a data file.

In implementations, the generating the resolution data can include encoding the identifier and the IP address of the trusted third party in the n-dimensional barcode.

In implementations, the n-dimensional barcode can comprise a QR code.

In implementations, the method can further include generating a personal identification number (PIN) corresponding to response data and wherein the resolution data includes the PIN.

In implementations, the method further comprise generating a personal identification number (PIN) corresponding to response data; and providing the PIN to the user.

In implementations, the providing the resolution data can include providing the QR code and an authentication mark indicating the QR code has been generated by the trusted third party.

In implementations, the target content data can include a first target content data and response data can include a first response data that includes the first target content data and the method can further include generating a mapping to reflect an association between the identifier and the first response data; and modifying the mapping to reflect an association between the identifier and a second response data, the second response data including a second target content data that is different from the first target content data.

In implementations, the target content data can include a first target content data and response data can include a first response data that includes the first target content data and the method can further include generating a mapping to reflect an association between the identifier and the first response data; modifying the mapping to reflect an association between the identifier and a second response data, the second response data including a second target content data that is different from the first target content data; receiving the request data including the identifier; extracting the identifier from the request data; identifying the second response data based on the mapping; and providing the second response data.

In implementations, the request data can be received from an author of the target content data and receiving the target content data can further include receiving the target content data from the author of the target content data; and providing, to the author, a business-to-business Application Programming Interface (B2B API) that enables the author to send the target content data to the trusted third party and to receive the resolution data from the trusted third party.

In implementations, the encoding the identifier and the IP address of the trusted third party in the n-dimensional barcode can include encoding the identifier and the IP address of the trusted third party in the QR code using a base64 encoding scheme or a custom encoding scheme.

In implementations, the method can further include storing the QR code in a computer-readable storage medium at the trusted third party; and providing a memory address corresponding to a location of the stored QR code.

In implementations, a non-transitory computer readable storage medium is disclosed that can comprise instruction that cause one or more processors to perform a method. The method can include receiving request data that includes an identifier; extracting the identifier from the request data; retrieving a response data corresponding to the target content data based on the identifier, wherein the response data and the identifier are associated with an n-dimensional barcode; verifying the target content data; and transmitting the response data that was retrieved to an electronic device.

In implementations, the target content data can include any, or combinations of, a target internet address, a promotion, an image, and a data file.

In implementations, the n-dimensional barcode can include or be a one-dimensional barcode.

In implementations, the n-dimensional barcode can include or be a two-dimensional barcode.

In implementations, the method can include storing a personal identification number (PIN) corresponding to the target content data; and receiving a confirmation that the PIN corresponds to the target content data.

In implementations, a trusted third party system is disclosed for generating resolution data having a trusted content. The trusted third party can include one or more processors; and a non-transitory computer readable storage medium comprising instruction that cause the one or more processors to perform a method comprising: receiving request data that includes an identifier; extracting the identifier from the request data; retrieving a response data corresponding to the target content data based on the identifier, wherein the response data and the identifier are associated with an n-dimensional barcode; verifying the target content data; and transmitting the response data that was retrieved to an electronic device.

Importantly, although the disclosure is contemplated primarily in the context of QR codes, it can be applied to any type of bar code that is capable of encoding URLs or other types of content that a business wishes to transfer to a user. The disclosure may be applied to various types of contents, including barcodes and in particular 2D matrix barcodes such as QR codes.

It is to be understood that both the foregoing general description and the following detailed description are exemplary and explanatory only and are not restrictive of the disclosure, as claimed.

BRIEF DESCRIPTION OF THE DRAWINGS

The drawings are not necessarily to scale. Instead, emphasis is generally placed upon illustrating the principles of the disclosures described herein. It is to be understood that the following detailed description is exemplary and explanatory only and is not restrictive of any disclosure, as claimed. The accompanying drawings, which are incorporated in and constitute a part of this specification, illustrate several embodiments consistent with the disclosures and together with the description, serve to explain the principles of the disclosures. In the drawings:

DETAILED DESCRIPTION

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. While several exemplary embodiments and features are described herein, modifications, adaptations, and other implementations are possible, without departing from the spirit and scope of the disclosure. Accordingly, the following detailed description does not limit the disclosure. Instead, the proper scope of the disclosure is defined by the appended claims.

Figure 1:
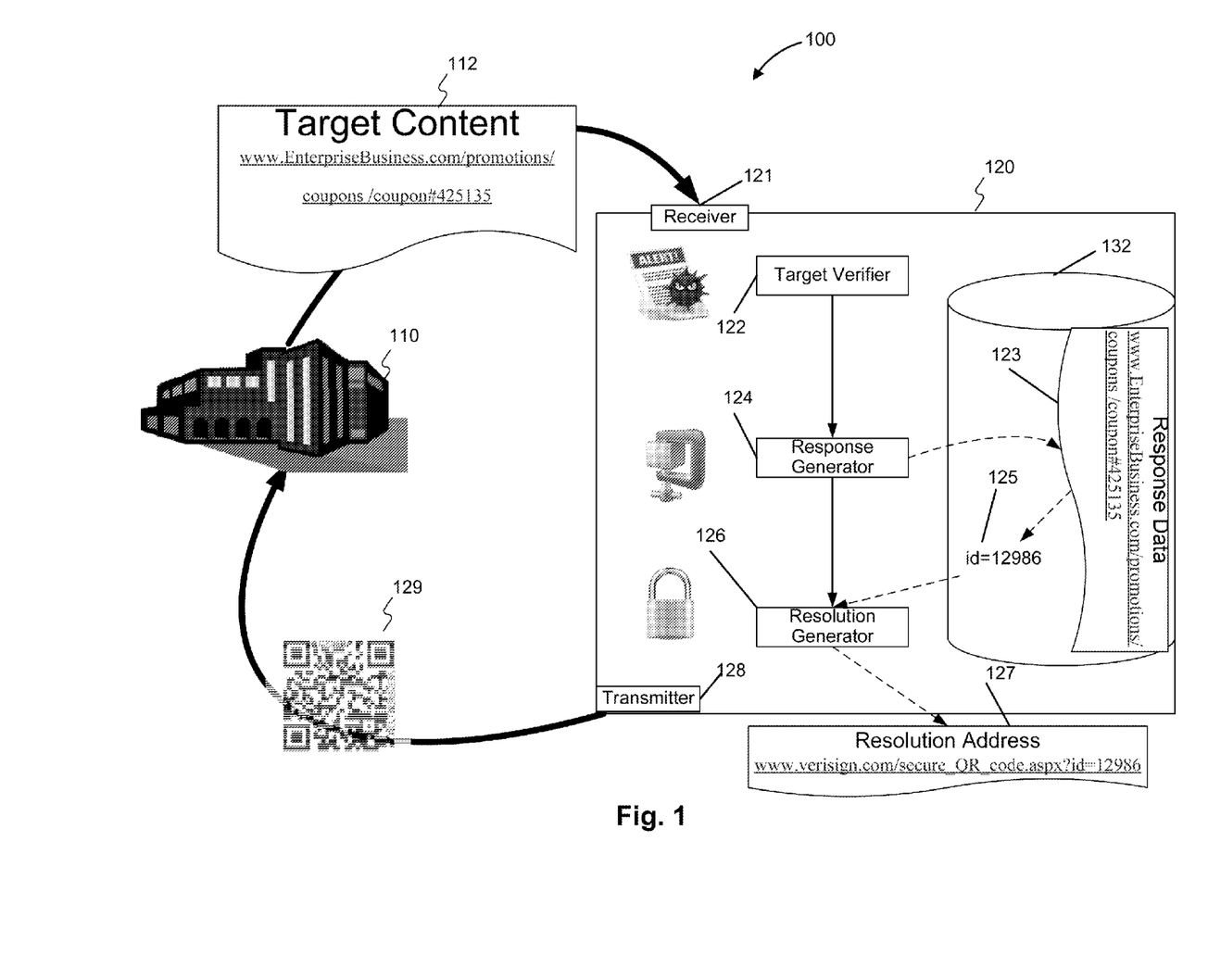
FIG. 1 illustrates an exemplary system for creation of trusted content in accordance with some embodiments.

In various embodiments, a certificate authority (CA) creates for a business trusted content that can be safely used by a user. FIG. 1 illustrates an exemplary system 100 for creation of trusted content in accordance with some embodiments. System 100 includes an author 110 and a certificate authority (CA) 120. In various embodiments, author 110 is a business client of CA 120 who creates a target content 112 and in response receives from CA 120 a corresponding trusted content in the form of resolution data 129, which in the embodiment of FIG. 1 is a QR code.

For example, in FIG. 1, author 110 is a business (called Enterprise Business) and target content 112 is a URL ("target URL" or "destination URL") created by author 110. Further, resolution data 129 is a QR code that encodes an address ("resolution address"), as further explained below. In FIG. 1, author 110 desires to encode into a trusted QR code the target URL www.EnterpriseBusiness.com/promotions/coupons/coupon#425135, which encodes a URL address of a coupon issued by author 110. Alternatively, author 110 may advertise a special product or offering, such as a contest, and may thus encode the URL of the contest's webpage into a trusted QR code. In some embodiments, whenever a user scans the trusted QR code with the user's mobile device, the mobile device displays the content of the barcode. In some embodiments, the mobile device, upon selection and load commands by the user or automatically, opens the target address or displays the target content.

CA 120 is a system that receives target content 112 and accordingly creates a trusted content, for example, trusted QR code 129, for author 110. In the embodiment shown in FIG. 1, CA 120 includes various modules including a receiver 121, a target verifier 122, a response generator 124, a resolution generator 126, a transmitter 128, and a storage medium 132.

Receiver 121 receives from author 110 target content 112 and transmitter 128 transmits to author 110 resolution data 129. In some embodiments, receiver 121 and transmitter 128 may be a processor executing receiver and transmission software modules. In some embodiments, receiver 121 and transmitter 128 may be dedicated hardware modules executing firmware for receiving and transmitting information, respectively. Receiver 121 and transmitter 128 may also respectively include a network receiver and transmitter, such as a wired or a wireless network card, and execute the corresponding software, for respectively receiving target content 112 from a network connected to author 110 and transmitting to that network resolution data 129. Alternatively, in various embodiments, author 110 and CA 120 communicate via other mechanisms, for example, near-field communication techniques.

Target verifier 122 verifies the content of target content 112. In some embodiments, target verifier 122 can include a malware analyzer, e.g., a virus detector, for checking that target content 112 does not include any malicious software that might harm a user's receiving device. Alternatively, in some embodiments, target verifier 122 can include a content analyzer for checking whether target content 112 includes any content that might not be appropriate for a specific group of users. In some embodiments, target verifier 122 is a hardware module, e.g., a processor, which executes software codes encoding the malware analyzer or the content analyzer, or both. In the embodiment shown in FIG. 1, target verifier 122 verifies that the target URL www.EnterpriseBusiness.com/promotions/coupons/coupon#425135 does not direct to a location which includes malware or inappropriate content.

Response generator 124 generates response data 123 and an identifier 125 for response data 123. In some embodiments, depending on the results of the analysis by target verifier 122, response data 123 is data that either points to target content 112 or points to a warning or an access denial message. In the embodiment shown in FIG. 1, for example, target verifier 122 verifies that target content 112 is safe and accordingly response generator 124 generates response data 123 that includes the URL address www.EnterpriseBusiness.com/promotions/coupons/coupon#425135 pointing to the coupon.

Upon generating response data 123, response generator 124 also generates identifier 125. In some embodiments, identifier 125 is a unique identifier for response data 123. In the embodiment shown in FIG. 1, response generator generates identifier 125 with a value "12986" and maps this identifier to response data 123. Moreover, in some embodiments, response generator 124 passes identifier 125 to resolution generator 126.

Resolution generator 126 receives identifier 125 and accordingly generates a resolution address 127. In some embodiments, resolution address 127 includes an address, e.g., a URL address, of CA 120. Moreover, resolution address 127 encodes identifier 125. In the embodiment shown in FIG. 1, for example, resolution address 127 is the URL address www.verisign.com/secure_QR_code.aspx?id=12986, which includes the URL address of CA 120 (www.verisign.com) and also the value of identifier 125 (id=12986). A browser, upon receiving resolution address 127, connects to a server for CA 120 (here verisign.com) and sends to that server the identifier also embedded in resolution address 127. Alternatively, in some embodiments, resolution generator 126 generate a shortened URL, such as "http://vsn.qr/znqkh2", which uniquely identifies CA 120 and the target URL or identifier 125, and embeds that shortened URL in resolution address 127.

In the embodiment of FIG. 1, resolution data 129 is a QR code that encodes resolution address 127. CA 120 transmits, through transmitter 128, resolution data 129 to author 110. Author 110 can then apply the QR code directly on its products or on a location, e.g., a billboard, to be scanned by a user.

In some embodiments, the author sends the CA the target content or receives the QR code via a web application. In some other embodiments, the author uses an application programming interface (API) to interact with the CA. In particular, such an API can enable a business to interact with another business, e.g., the CA. Moreover, in some embodiments, the CA encodes the QR image into a base64 or a custom encoding and transfers that encoded QR image to the author. Such encoding minimizes the amount of data transfer over the network.

In yet other embodiment, instead of transmitting the QR code, the CA stores the QR image in storage medium 132 and sends an address of the image to author 110. Author 110 can thus retrieve the QR image by using its address at a later time.

Figure 2:
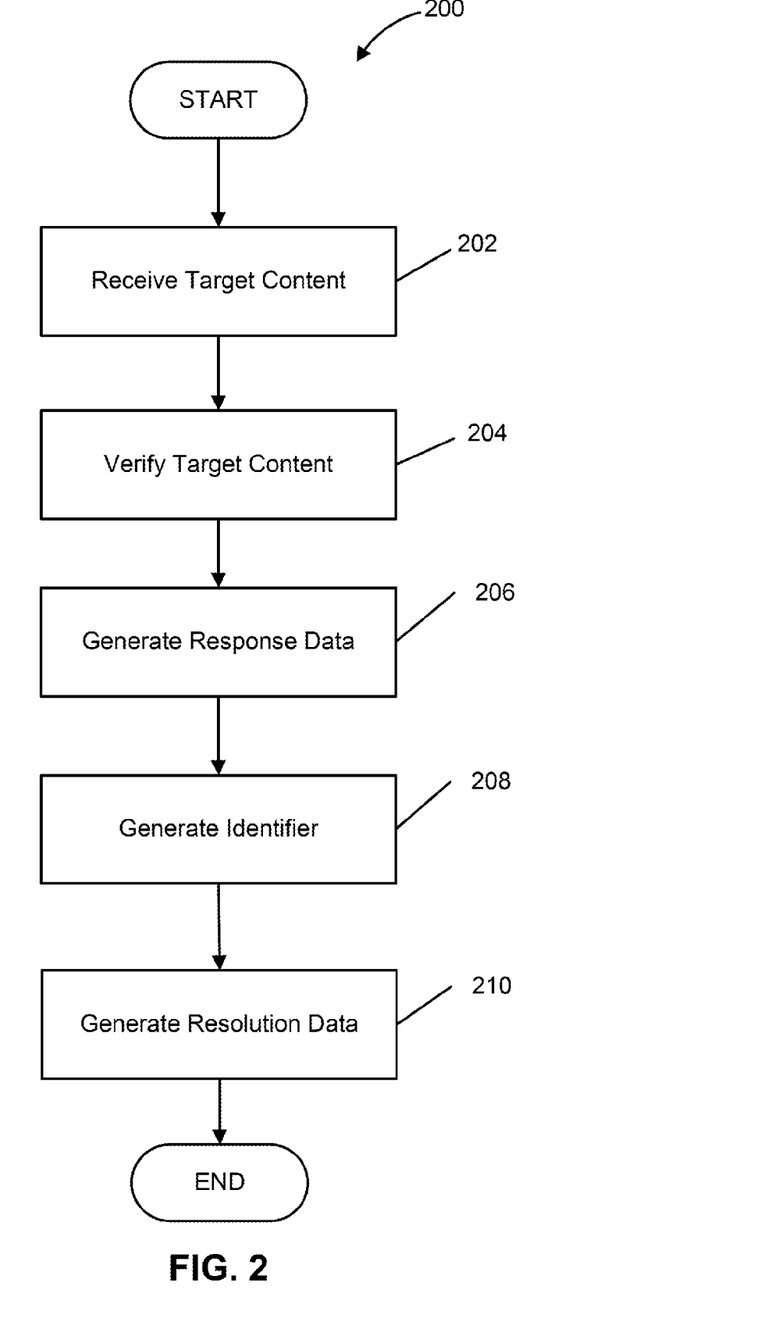
FIG. 2 illustrates an exemplary flow chart for generating resolution data according to some embodiments.

The CA thus performs steps required to generate resolution data based on the target content received from the author. FIG. 2 illustrates an exemplary flow chart 200 performed by the CA for generating resolution data according to some embodiments.

In block 202, the CA receives the target content. In various embodiments, target content can be the URL address of the website of an author, the address of a promotion or an advertisement by the author, or a file containing an image, audio data, or video data, which the author wishes to convey to a customer via some trusted content. In some other embodiments, the CA receives the target content in the form of a text, a barcode encoding the target content or an address of the target content, or digital data representing the barcode. In some embodiments, the barcode itself is a QR code.

In block 204, the CA verifies the target content. In various embodiments, the CA verifies the target content by checking whether the target content includes any malicious software or content that might not be appropriate for a specific group of users.

In block 206, the CA generates response data in accordance with the results of the verification in block 204. In some embodiments, if in block 204, the CA determines that the target content includes malicious or inappropriate content, the CA generates response data to include warning or access denial messages, as explained below in detail. Alternatively, if the CA determines that the target content is safe and appropriate, in some embodiments the CA generates response data that may include a target URL pointing to the target content.

In block 208, the CA generates an identifier for the response data. In various embodiments, the CA generates the identifier as a unique identifier of the response data. In some embodiments, the CA generates for each response data a unique identifier and stores, in a storage medium, each response data and its corresponding identifier. Further, the CA stores information related to the one-to-one mapping between each identifier and its corresponding response data, such that a response data can be identified from its identifier.

In block 210, the CA uses the identifier to generate resolution data. In various embodiments, the resolution data is a resolution address which includes an address, e.g., a URL address, of the CA and also encodes the identifier. In some embodiments, the resolution address of the CA is a shortened URL that uniquely identifies the CA and the target content. In some embodiments, the shortened URL may be a vrsn URL.

In some embodiments, the author receives the resolution address and generates a barcode, e.g., a QR code, encoding the resolution address. In some embodiments, the CA generates the resolution data as a barcode, e.g., a QR code, that encodes the resolution address.

Figure 3:
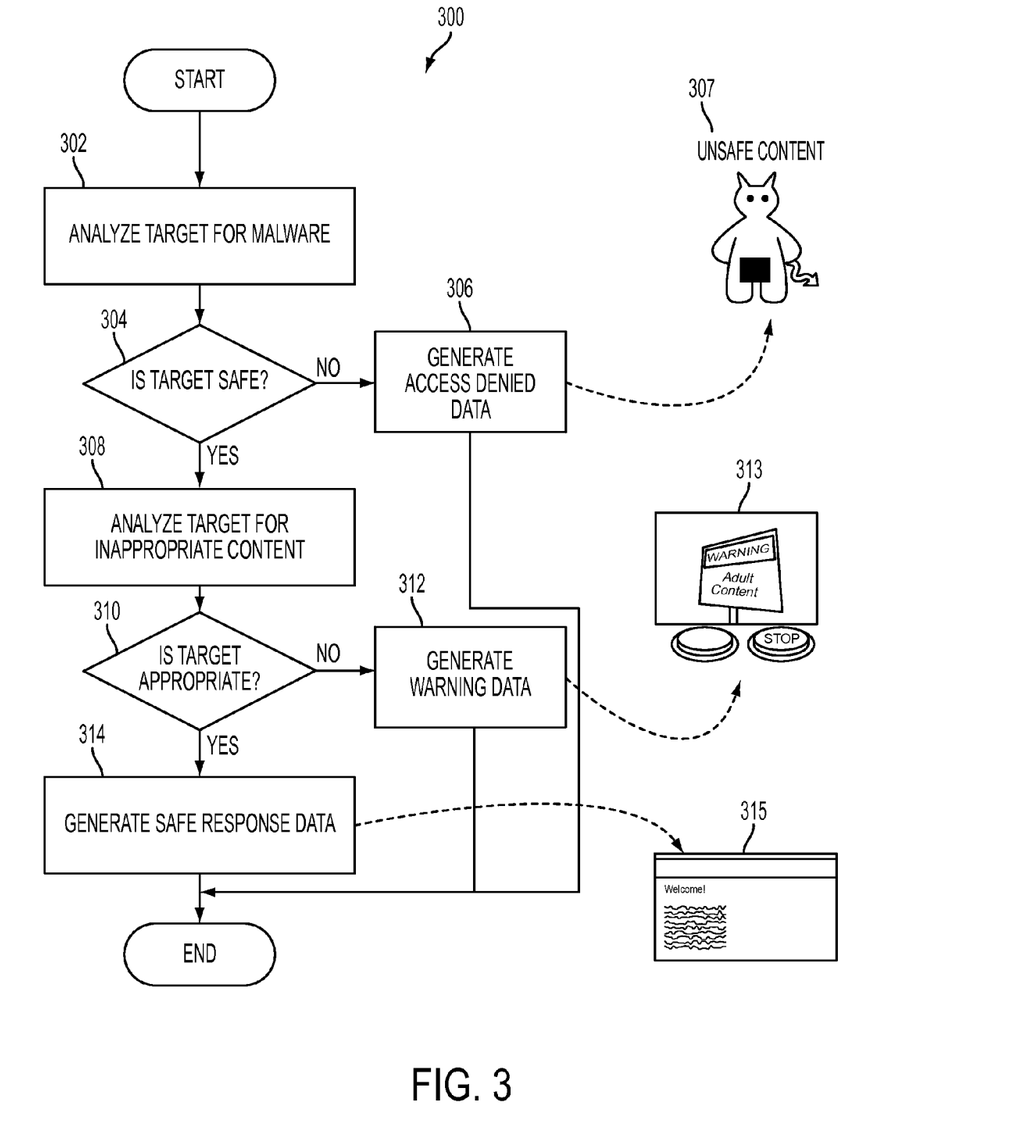
FIG. 3 illustrates an exemplary flow chart for verifying the target content and generating response data, in accordance to some embodiments.

FIG. 3 is an exemplary flow chart 300 illustrating in more detail the steps of verifying the target content and generating response data, in accordance to some embodiments.

In block 302, the CA analyzes the target content for harmful content, e.g., computer viruses, worms, trojan horses, or spywares. To that end, the CA may apply an anti-malware software tool to the target content. In some embodiments, the CA uses VIMS, a malware detector created by VeriSign Inc.

Based on the results of block 302, in decision block 304 the CA determines whether the target content is deemed safe. If the target content is not safe (block 304: No), in block 306 the CA generates a corresponding message as the response data and ends the process. For example, in block 306 the CA may generate an access denied page 307, for informing the user that the user cannot access the target content because the target content is unsafe. In some embodiments, and based on the policy of the business, the CA may instead generate a warning or an alert and give the user the option to further proceed or stop navigating into the unsafe content.

If the target content is deemed as safe (block 304: Yes), in block 308 the CA analyzes the target content for inappropriate content. For example, in some embodiments, the CA checks whether the target content includes illegal content, or adult content that might not suit young users. Illegal content may include, for example, content that is being distributed in violation of copyright laws.

Based on the results of block 308, in decision block 310 the CA determines whether the target content is appropriate. If the target content is not appropriate (block 310: No), in block 312 the CA generates a corresponding message as the response data and ends the process. For example, in block 312 the CA may generate a warning page 313, for warning the user that the target content includes some inappropriate content and inquiring the user whether to proceed.

If the target, which was already deemed safe in block 304, is also deemed appropriate (block 310: Yes), the CA generates a safe response data 315 that can be used by the user and ends the process. In some embodiments, safe response data 315 includes the target content. In some other embodiments, safe response data 315 includes an address pointing to the location of target content on a server.

Figure 4:
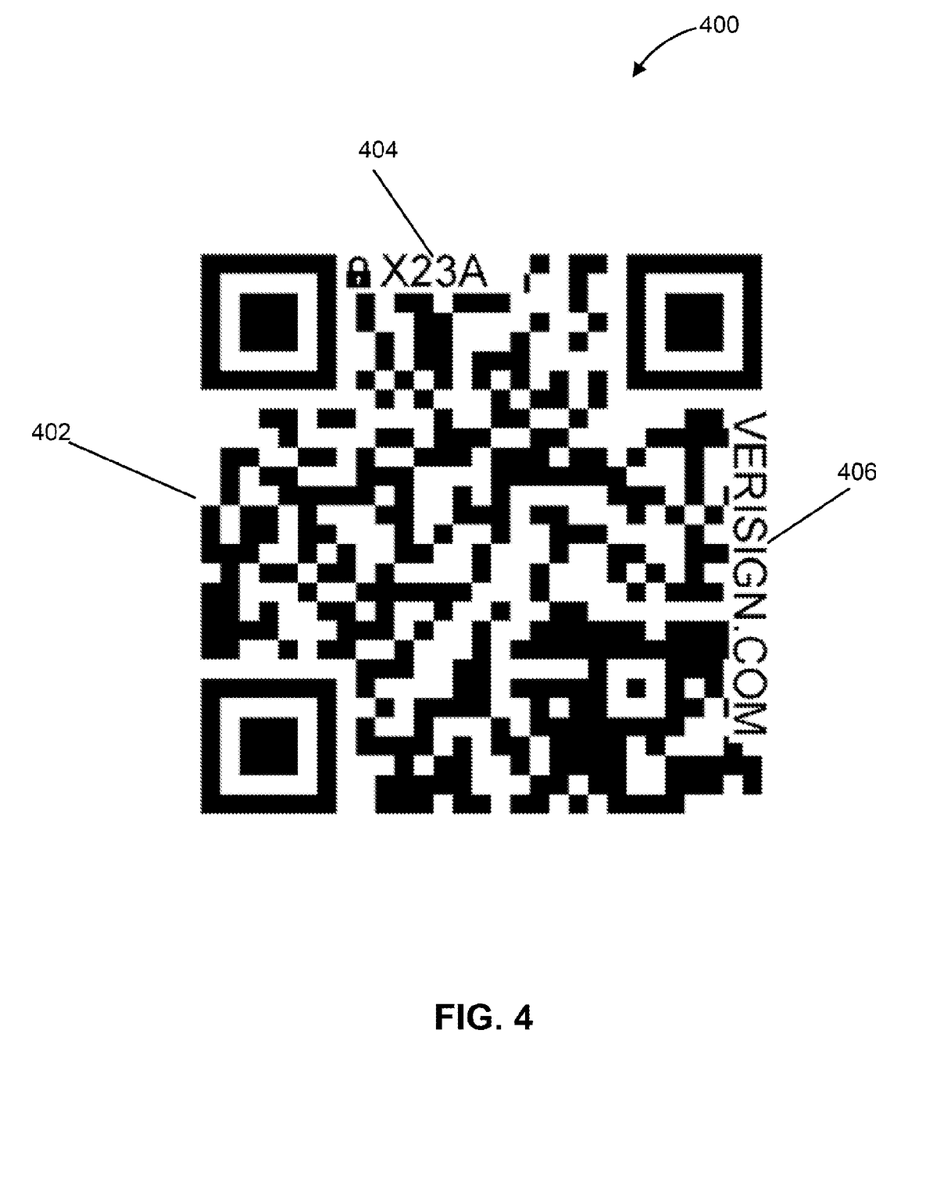
FIG. 4 illustrates a QR code in accordance with some embodiments.

In some embodiments, the CA generates and sends to the author a QR code that encodes the response data. Further, in some embodiments, the CA also includes in the QR codes some human-readable information for authenticating the QR code or providing a seal of confidence. FIG. 4 illustrates such a QR code 400 in accordance with some embodiments. QR code 400 includes a QR pattern 402, a human-readable PIN 404, and a human-readable authentication mark 406. In some implementations, the authentication mark 406 can include alphanumeric characters or a picture that is unique to the trusted third party, a website associated with the trusted third party, the content provider, a website associated with the content provider, or the content consumer.

QR pattern 402 is the pattern of the QR code which encodes the information in the QR code. In various embodiments, QR pattern 402 includes a set of two-dimensionally arranged squares, rectangles, dots, hexagons, or other shapes of varying lengths and widths distributed in two dimensions. In some other embodiments, the shapes in QR pattern 402 all have the same color. In some other embodiments, the shapes in QR pattern 402 have different colors, and thus QR code 400 conveys some of the information by using those various colors.

QR code patterns present some error correction capability due to some redundancy that is provided in their pattern. In other words, if some portion of the QR code is lost or not captured correctly, the information embedded in the QR code can still be recovered from the remainder of the QR code. Therefore, in these embodiments, a portion in the area of the QR code pattern can be covered by some other information without affecting the information encoded in the QR code. In some embodiments, the information in the QR code can be fully recovered from at little as 70% of the pattern embedded in the QR code. In these embodiments, thus, up to 30% of the area of the QR code can be used for conveying information other than the QR pattern.

Accordingly, in the embodiment shown in FIG. 4, the CA has overlaid some portions of QR code 400 by PIN 404, and authentication mark 406. PIN 404 is a human-readable PIN that corresponds to the response data encoded in the QR code, as described below in more detail. In some embodiments, the CA generates PIN 404 as a unique PIN mapped to the response data and stores the PIN and the mapping to the response data in a storage medium. In yet other embodiments, the CA maps and stores a one-to-one relationship between a PIN and an identifier, both corresponding to the same response data. In some embodiments, the CA generates PIN 404 as part of generating resolution data in block 210 of flowchart 200.

PIN 404 is a human-readable PIN and in various embodiments includes alphanumeric characters, shapes, or other images that can be easily recognized by a user. In the embodiment shown in FIG. 4, PIN 404 consists of the characters X23A. PIN 404 is used by the user when interacting with the CA to further verify the authenticity of the QR code. In particular, the CA can identify an imposter who has tampered with a QR code to modify the resolution data, because the tampered QR code does not include a PIN that corresponds to the modified resolution data.

Authentication mark 406 is also a human-readable portion that indicates to the user that the QR code was generated by the CA. In some embodiments, authentication mark 406 includes a trademark of the CA, a web address of the CA, or another identification of the CA. In FIG. 4, for example, authentication mark 406 consists of VERISIGN.COM, indicating that QR code 400 was generated by VeriSign Inc and thus infer the QR code must point to VeriSign.com. Authentication mark 406 provides to the user an additional level of authentication for QR code 400 as described below in more detail. In some embodiments, authentication mark 406 changes based on the target content. In some embodiments, the CA generates authentication mark 406 as part of generating resolution data in block 210 of flowchart 200.

A user, who is familiar with the CA and trusts the CA, will trust the QR code that bears the authentication mark of the CA. In particular, when using the QR code, the user expects the QR code to point to the address of the CA, whose authentication mark 406 appears on the QR code. For example, a user expects QR code 400 to direct the user's device to VeriSign.com. Thus, the user may refuse to use the QR code if the QR code resolves to a different address or points to a different site. Such a difference may indicate that the QR code has been tampered by an imposter with the intention to redirect the user's device to a different address. Alternatively, a user's device may be configured such that it will automatically refuse using a QR code if the QR code does not point to the address of the trusted CA. In some embodiments, the QR code encodes the identifier, and the user device is configured to, upon reading an identifier, append to the identifier the address of a predetermined trusted CA. In some embodiments, the user device is configured to read the identifier and send the identifier to a predetermined trusted CA.

In various embodiments, the CA may generate and include one, both, or none of a PIN and an authentication mark in the QR code. Moreover, in various embodiments, PIN 404 or authentication mark 406 are not overlaid on some section of the QR code and are instead provided next to the QR code, or by other means. In some embodiments, PIN 404 may be provided to the user via alternative methods, e.g., through mail, email, or phone messages.

The author thus uses the resolution data, e.g., the QR code, in its advertisements or other commercial interactions with the user. A user, upon seeing the QR code, can use an electronic device to scan and resolve the QR code such that the user's device connects to the CA and retrieves the content encoded in the QR code.

Figure 5:
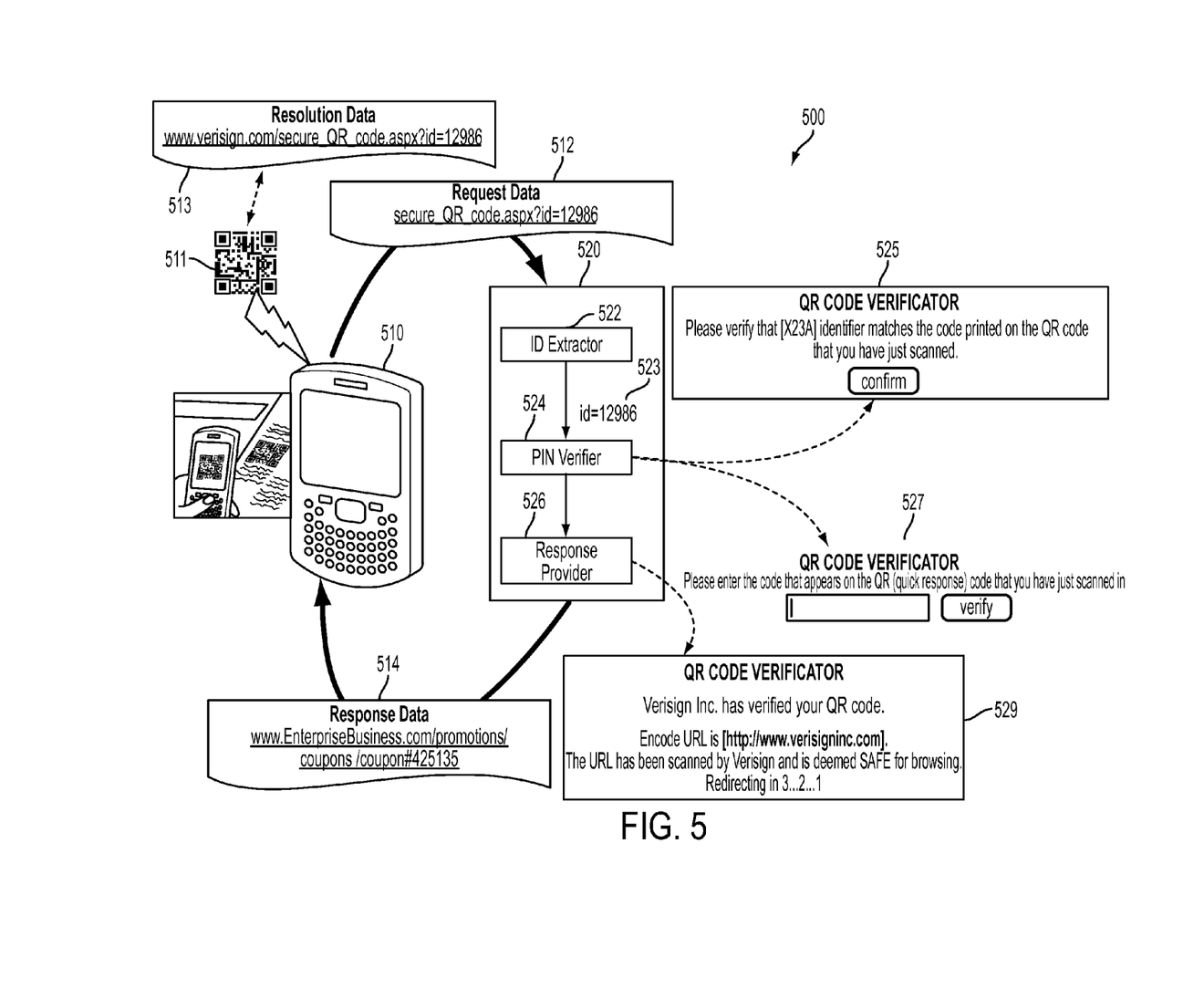
FIG. 5 illustrates an exemplary system for resolving resolution data in accordance with some embodiments.

FIG. 5 illustrates an exemplary system 500 for resolving resolution data, e.g., a QR code, in accordance with some embodiments. System 500 includes a user device 510 and a CA 520. In various embodiments, user device 510 is a scanner or a smartphone capable of scanning a barcode, e.g., a QR code 511. In some embodiments, user device 510 is a smartphone that includes a camera and executes an application for decoding barcodes. A user can use the smartphone to take a picture of QR code 511 and then use the application to decode QR code 511. In some embodiments, user device 510 captures and stores a picture of QR code 511 for later usage. Later, user device 510 restores the stored picture to extract the information encoded in QR code 511. In some embodiments, user device 510 directly scans QR code 511 and extracts the encoded information. In some embodiments the information encoded in QR code 511 is in the form of an HTTP or HTTPS URL. In particular, QR code 511 encodes response data 513, which includes the resolution address www.verisign.com/secure_QR_code.aspx?id=12986 discussed above.

User device 510 decodes and analyzes the information encoded in QR code 511 to determine the target address and further to extract a request data 512. In the embodiment shown in FIG. 5, the target address extracted from QR code 511 is www.verisign.com and the request data 512 includes the identifier value 12968 also extracted from QR code 511, i.e., from the information secure_QR_code.aspx?id=12986.

User device 510 uses the extracted target address to connect to CA 520 and further transmits to CA 520 request data, and in response receives from CA 520 response data 514. In the embodiment of FIG. 5, response data 514 includes the target URL www.EnterpriseBusiness.com/promotions/coupons/coupon#425135 discussed above. In some embodiments, response data 514 also includes other information related to the target URL, such as, the type of its content or whether it contains any malicious code.

In the embodiment shown in FIG. 5, CA 520 receives and processes information embedded in request data 512 and accordingly generates response data 514. In accordance to the embodiment shown in FIG. 5, CA 520 includes various modules for processing request data 512, including an ID extractor 522, a PIN verifier 524, and a response provider 526. In various embodiments, ID extractor 522, PIN verifier 524, or response provider 526 are each a hardware or a software module performing the functions outlined below. In some embodiments, CA 520 includes a processor that executes software modules corresponding to one or more of the ID extractor 522, PIN verifier 524, and response provider 526.

ID extractor 522 receives information in request data 512 and extracts from request data 512 an identifier 523. In the embodiment shown in FIG. 5, ID extractor 522 receives request data 512 which includes the information related to identifier 523, and accordingly extract the value 12986 for identifier 523. ID extractor transmits identifier 523 to PIN verifier 524.

In embodiments which use a PIN for further verification of the QR code, PIN verifier 524 uses identifier 523 to identify the corresponding PIN. In particular, PIN verifier 524 uses the mapping between the identifiers and the PINs to identify the PIN corresponding to identifier 523. In yet other embodiments, PIN verifier 524 identifies the PIN by first identifying the resolution data that corresponds to the identifier, and then identifying the PIN that corresponds to the identified resolution data.

Upon identifying the PIN, PIN verifier 524 verifies the identified PIN by interacting with the user in accordance with some embodiments. In the embodiments shown in FIG. 5, the identified PIN is X23A. In some embodiments, PIN verifier 524 causes a PIN confirmation form 525 or its equivalent to be displayed on user device 510. PIN confirmation form 525 displays the identified PIN (X23A) and requests that the user confirm that the identified PIN (X23A) is the same as the human-readable PIN that the user can read on QR code 511. Alternatively, in some embodiments, PIN verifier 524 causes a PIN entry form 527 or its equivalent to be displayed on user device 510. PIN entry form 527 requests that the user enter the human-readable PIN that the user can read on QR code 511. PIN verifier 524 reads the PIN that the user enters into PIN entry form 527 and verifies that the entered PIN is the same as the identified PIN.

If the PIN read by the user from QR code 511 matches the identified PIN, PIN verifier 524 directs response provider 526 to provide the response to user device 510. In some embodiments, response provider 526 uses identifier 523 to identify the corresponding response data, e.g., by using the mapping between the response data and the identifier. Upon identifying the corresponding response data, that is, response data 514, response provider 526 transmits that response data to user device 510.

In the embodiment shown in FIG. 5, response provider 526 causes a response retrieval screen 529 to be displayed on user device 510 to inform the user that the PIN has been verified and that user device 410 is being redirected to the target URL embedded in response data 514. In some embodiments, response provider 526 automatically redirects user device 510 to the target URL using a redirect mechanism, such as the 302 http redirect. Upon redirect, the target URL automatically opens on user device 510. In some embodiments, response provider 526 transmits target URL to user device 510 and directs the user to open the target URL to access the desired content. In yet other embodiments, the CA performs as a proxy server for the server presenting the target content.

Figure 6:
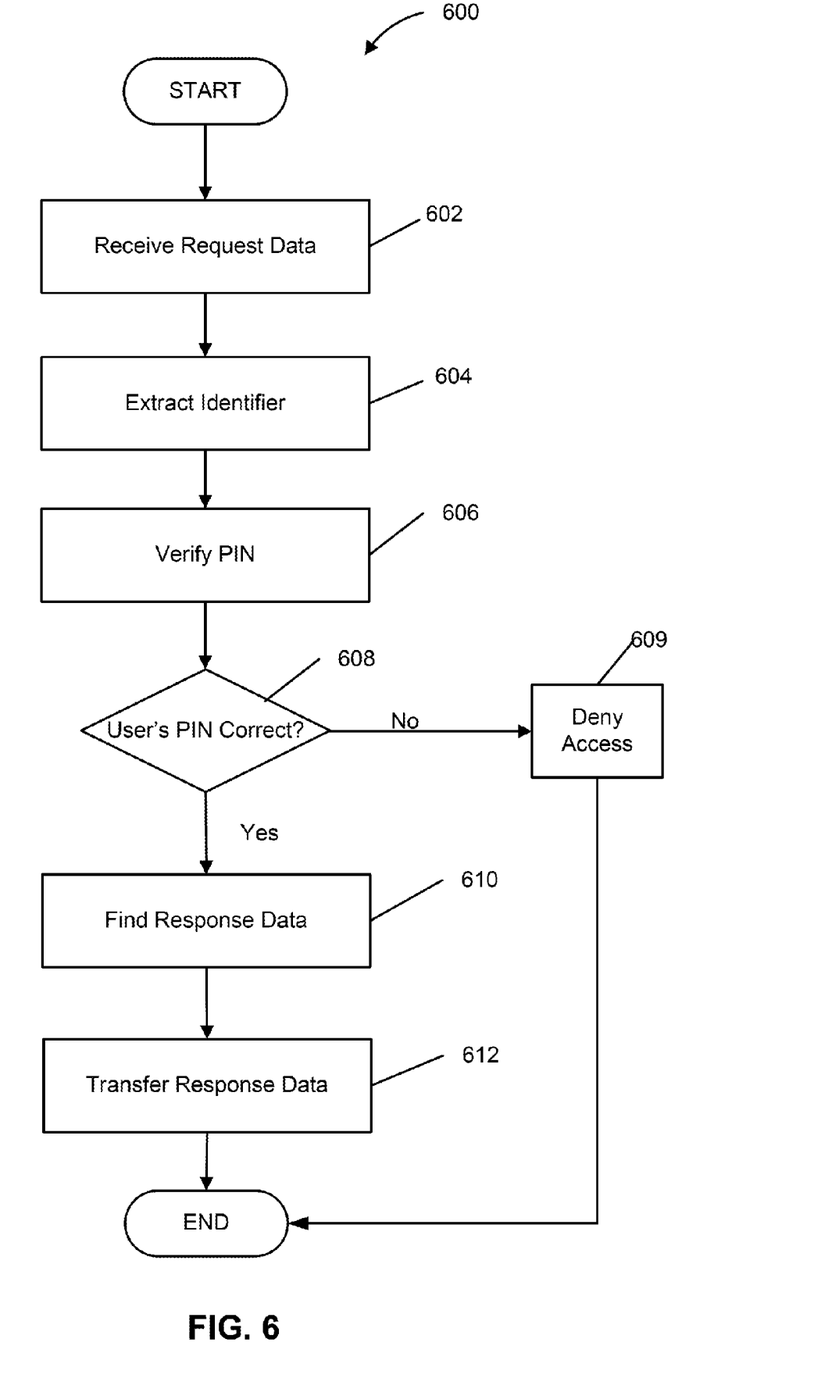
FIG. 6 illustrates an exemplary flow chart for verification and transfer of response data in accordance with some embodiments.

The CA thus performs steps required to verify the request data, and accordingly send the response data to the user device. FIG. 6 illustrates an exemplary flow chart 600 for verification and transfer of response data in accordance with some embodiments.

In block 602, the CA receives the request data. In some embodiments, the request data includes an identifier. In some embodiments, the request data is extracted from sections of a URL address that is generated by decoding a QR code. In block 604, the CA extracts the value of the identifier from the received request data.

In block 606, the CA verifies that the user is in possession of the PIN that corresponds to the received identifier. In various embodiments, the CA first finds the corresponding PIN by using a direct mapping between the identifiers and the PINs, or an indirect mapping between them using the response data corresponding to both. Further, in some embodiments, the CA uses a PIN confirmation form or a PIN entry form displayed on the user's device to verify that the identified PIN is the same as a human-readable PIN that the user has received along with the request data.

In decision block 608, the CA checks whether the user is in possession of the identified PIN. If the CA determines that the user was not in possession of the correct PIN (block 608: No), in block 609 the CA denies the user access to the corresponding response data and ends the process. In some embodiments, in block 608 the CA displays a message on the user's device, indicating that the PIN could not be verified. In some other embodiments, the CA may request the user to try re-entering the PIN and attempt verifying the reentered PIN up to a number of times.

If the CA verifies that the user was in possession of the correct PIN (block 608: Yes), in block 610 the CA finds the response data that corresponds to the identifier. In some embodiments, the CA uses the pre-stored mapping between the identifiers and the response data to find the corresponding response data.

In block 612, the CA transmits the found response data to the user's device and ends the process. In some embodiments, the response data is in the form of a data file, an image, an audio file, a video file, or a URL address, transferred to the user's device. In some embodiments, the response data is in the form of a URL address that is redirected to the user's device, such that the user's device automatically opens the destination of the URL address.

In some embodiments, an author can later switch the target content without changing the identifier. The CA can thus provide a service to the author allowing the author to switch the mapping of the same identifier from a first target content to a second target content. In these embodiments, an identifier is originally mapped to a first target content, e.g., www.ijk-.com. Thus, users who scan the corresponding QR code, encoding the identifier, is directed to the first target content. The author might then generate a second target content, e.g., www.xyz.com that is distinct from the first target content. The author can then use the service provided by the CA to change the mapping of the identifier from the first target content to the second target content. From then on, a user who scans the same QR code will be directed to the second target content.

In yet other embodiments, the CA provides an auditing service. Via the auditing service, the CA collects the statistics of some specific actions by the user's of the system and feeds them to the system for other usages. For example, the auditing service may collect the statistics of the number of times a specific QR code is decoded, and use that statistics to identify the QR codes that are highly used or underused.

Those skilled in the art will appreciate that, although described primarily in the context of barcodes for optical scanning, the present disclosure may be applied to any situation in which physical objects or phenomena in which machine-readable information has been encoded are converted to digital or electronic data by a scanning, listening, or other detection advice. For example, the present disclosure may be applied to information encoded within magnetic strips, audio signals, RFID signals, and other real-world "hardlinks."

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

In various embodiments, one of more of the disclosed modules are implemented via one or more processors executing software programs for performing the functionality of the corresponding modules. In some embodiments, one or more of the disclosed modules are implemented via one or more hardware modules executing firmware for performing the functionality of the corresponding modules. In various embodiments, one or more of the disclosed modules or disclosed storage mediums are internal or external to the disclose systems. In some embodiments, one or more of the disclosed modules or storage media are implemented via a computing "cloud", to which the disclosed system connects via an internet and accordingly uses the external module or storage medium. In some embodiments, the disclose storage media include non-transitory computer readable media, e.g., a CD-ROM, a computer storage, or a flash memory, for storing information.

Accordingly, the disclosure is not limited to the above-described embodiments, but instead is defined by the appended claims in light of their full scope of equivalents.

The invention claimed is:

1. A non-transitory computer readable storage medium comprising instructions that cause one or more processors to perform a method comprising:
   receiving target content data;
   verifying the target content data;
   generating an identifier corresponding to the target content data that has been verified;
   generating resolution data comprising an n-dimensional barcode that includes identifier information corresponding to the identifier and address information corresponding to an internet protocol (IP) address of a trusted third party; and
   providing the resolution data to a user.

2. The non-transitory computer readable storage medium of claim 1, further comprising instructions that cause the one or more processors to perform:
   receiving request data that includes the identifier;
   extracting the identifier from the request data;
   identifying response data based on the identifier; and
   providing the response data.

3. The non-transitory computer readable storage medium of claim 2, wherein verifying the target content data further includes:
   determining whether the target content data is safe;
   if the target content data is determined to be safe, providing the target content data with the response data; and
   if the target content data is determined to be unsafe, providing a warning message with response data, wherein the warning message provides an indication that the target content data is unsafe.

4. The non-transitory computer readable storage medium of claim 2, wherein verifying the target content data further includes:
   analyzing the target content data;
   determining if the target content data is related to at least one of malware or inappropriate content;
   upon determining that the target content data is related to at least one of the malware or the inappropriate content, providing a warning message with the response data, wherein the warning message provides an indication that the target content data is related to at least one of the malware or the inappropriate content.

5. The non-transitory computer readable storage medium of claim 2, wherein the target content data is a first target content data and response data is a first response data that includes the first target content data, further including:
   generating a mapping to reflect an association between the identifier and the first response data;
   modifying the mapping to reflect an association between the identifier and a second response data, the second response data including a second target content data that is different from the first target content data;
   receiving the request data including the identifier;
   extracting the identifier from the request data;
   identifying the second response data based on the mapping; and
   providing the second response data.

6. The non-transitory computer readable storage medium of claim 1, wherein the target content data includes at least one of a target internet address, a promotion, an image, or a data file.

7. The non-transitory computer readable storage medium of claim 1, wherein generating the resolution data includes:
   encoding the identifier and the IP address of the trusted third party in the n-dimensional barcode.

8. The non-transitory computer readable storage medium of claim 7, wherein the n-dimensional barcode comprises a QR code.

9. The non-transitory computer readable storage medium of claim 8, further comprising instructions that cause the one or more processors to perform:
   generating a personal identification number (PIN) corresponding to response data; and
   providing the PIN to the user.

10. The non-transitory computer readable storage medium of claim 8, wherein providing the resolution data includes:
    providing the QR code and an authentication mark indicating the QR code has been generated by the trusted third party, wherein the authentication mark includes information that is unique to the trusted third party, a provider of the target content data, or receiver of the resolution data.

11. The non-transitory computer readable storage medium of claim 8, wherein encoding the identifier and the IP address of the trusted third party in the n-dimensional barcode includes:
    encoding the identifier and the IP address of the trusted third party in the QR code using a base64 encoding scheme or a custom encoding scheme.

12. The non-transitory computer readable storage medium of claim 8, further comprising instructions that cause the one or more processors to perform:
    storing the QR code in a computer-readable storage medium at the trusted third party; and
    providing a memory address corresponding to a location of the stored QR code.

13. The non-transitory computer readable storage medium of claim 1, further comprising instructions that cause the one or more processors to perform:
    generating a personal identification number (PIN) corresponding to response data and wherein the resolution data includes the PIN.

14. The non-transitory computer readable storage medium of claim 1, wherein the target content data is a first target content data and response data is a first response data that includes the first target content data, further including:
    generating a mapping to reflect an association between the identifier and the first response data; and
    modifying the mapping to reflect an association between the identifier and a second response data, the second response data including a second target content data that is different from the first target content data.

15. The non-transitory computer readable storage medium of claim 1, wherein the request data is received from an author of the target content data and receiving the target content data further includes:
    receiving the target content data from the author of the target content data; and
    providing, to the author, a business-to-business Application Programming Interface (B2B API) that enables the author to send the target content data to the trusted third party and to receive the resolution data from the trusted third party.

16. A non-transitory computer readable storage medium comprising instructions that cause one or more processors to perform a method comprising:
  receiving request data that includes an identifier;
  extracting the identifier from the request data;
  retrieving a response data corresponding to target content data based on the identifier, wherein the response data and the identifier are associated with an n-dimensional barcode;
  verifying the target content data by a trusted third party; and
  transmitting the response data that was retrieved to an electronic device.

17. The non-transitory computer readable storage medium of claim 16, wherein the target content data includes at least one of a target internet address, a promotion, an image, or a data file.

18. The non-transitory computer readable storage medium of claim 16, wherein the n-dimensional barcode is a one-dimensional barcode.

19. The non-transitory computer readable storage medium of claim 16, wherein the n-dimensional barcode is a two-dimensional barcode.

20. The non-transitory computer readable storage medium of claim 16, further comprising instructions that cause the one or more processors to perform:
  storing a personal identification number (PIN) corresponding to the target content data; and
  receiving a confirmation that the PIN corresponds to the target content data.

21. A trusted third party system for generating resolution data having a trusted content, the trusted third party system comprising:
  one or more processors; and
  a non-transitory computer readable storage medium comprising instruction that cause the one or more processors to perform a method comprising:
    receiving request data that includes an identifier;
    extracting the identifier from the request data;
    retrieving a response data corresponding to target content data based on the identifier, wherein the response data and the identifier are associated with an n-dimensional barcode;
    verifying the target content data; and
    transmitting the response data that was retrieved to an electronic device.

22. The trusted third party system of claim 21, wherein the target content data includes at least one of a target internet address, a promotion, an image, or a data file.

23. The trusted third party system of claim 21, wherein the n-dimensional barcode is a one-dimensional barcode.

24. The trusted third party system of claim 21, wherein the n-dimensional barcode is a two-dimensional barcode.

25. The trusted third party system of claim 21, further comprising instructions that cause the one or more processors to perform:
  storing a personal identification number (PIN) corresponding to the target content data; and
  receiving a confirmation that the PIN corresponds to the target content data.

* * * * *